United States Patent [19]

Yamasita et al.

[11] Patent Number: 4,801,792
[45] Date of Patent: Jan. 31, 1989

[54] ENDOSCOPE

[75] Inventors: Nobuo Yamasita; Iwao Kanamori, both of Hachiouji; Shinichiro Hattori, Akishima, all of Japan

[73] Assignee: Olympus Optical Co., Ltd., Tokyo, Japan

[21] Appl. No.: 28,316

[22] Filed: Mar. 20, 1987

[30] Foreign Application Priority Data

Mar. 22, 1986 [JP] Japan .................................. 61-64592

[51] Int. Cl.$^4$ ............................................... G01J 1/32
[52] U.S. Cl. ..................................... 250/205; 250/227; 350/336
[58] Field of Search ......................... 250/205, 227, 201; 350/355, 356, 357, 336; 128/6; 362/276, 32; 254/62; 258/228

[56] References Cited

U.S. PATENT DOCUMENTS

| | | | |
|---|---|---|---|
| 4,313,663 | 2/1982 | Stemme et al. | 350/336 |
| 4,333,720 | 6/1982 | Suzuki et al. | 350/336 |
| 4,340,811 | 7/1982 | Yamashita et al. | 250/227 |
| 4,678,900 | 7/1987 | Nishioka | 250/205 |
| 4,704,520 | 11/1987 | Kanno et al. | 250/205 |

Primary Examiner—David C. Nelms
Attorney, Agent, or Firm—Cushman, Darby & Cushman

[57] ABSTRACT

An endoscope provided with a stop comprising an annular electrochromic element arranged in an objective lens unit so that the transmittance of the stop is varied in accordance with the amount of light from an object to be observed which has been measured, in order to prevent brightness in a field of view from being rapidly changed when the distance from the distal end portion of the endoscope to the object to be observed is varied.

7 Claims, 3 Drawing Sheets 4,801,792

ENDOSCOPE

BACKGROUND OF THE INVENTION

(a) FIELD OF THE INVENTION

The present invention relates to endoscopes and more particularly to an optical system for endoscopes.

(b) DESCRIPTION OF THE PRIOR ART

Generally, an endoscope incorporates an observing optical system comprising an objective lens and an image guide and an illuminating optical system comprising an illuminating lens and a light guide in the body thereof. In such an endoscope, variation in the distance between the distal end portion of the body and the surface of an object brings about variations in the distance from the exit end face of the light guide to the surface of the object and the distance from the surface of the object to the entrance end face of the image guide. When the distances are varied as mentioned above, brightness in the field of view will be rapidly changed. Usually, therefore, when the object is observed from a short distance, the field of view is liable to be extremely illuminated and conversely when the object is viewed from a distance in some extent, the field of view tends to be dark in excess.

Thus, in order to solve this problem, consideration has been given to provide a stop in the above optical system. However, it has been impossible to incorporate a conventional stop mechanically constituted, which is large in size, in the body of an endoscope.

SUMMARY OF THE INVENTION

In view of the above circumstances, a primary object of the present invention is to provide an endoscope which is equipped with a stop capable of being incorporated in the body and which can moderate variations in brightness of a visual field in accordance with variations in the distance from the distal end portion of the body to the surface of an object.

According to the present invention, a stop means composed of an annular electrochromic element is arranged in an objective lens unit so that the transmittance of the stop means can be varied depending on the amount of light coming from an object to be observed which has been measured. Thereby, the amount of light reaching the visual field is adjusted automatically in accordance with the distance from the distal end portion of the endoscope to the surface of the object.

This and other objects as well as the features and the advantages of the present invention will be apparent from the following detailed description of the preferred embodiment when taken in conjunction with the accompanying drawings.

DESCRIPTION OF THE PREFERRED EMBODIMENT

Figure 1:
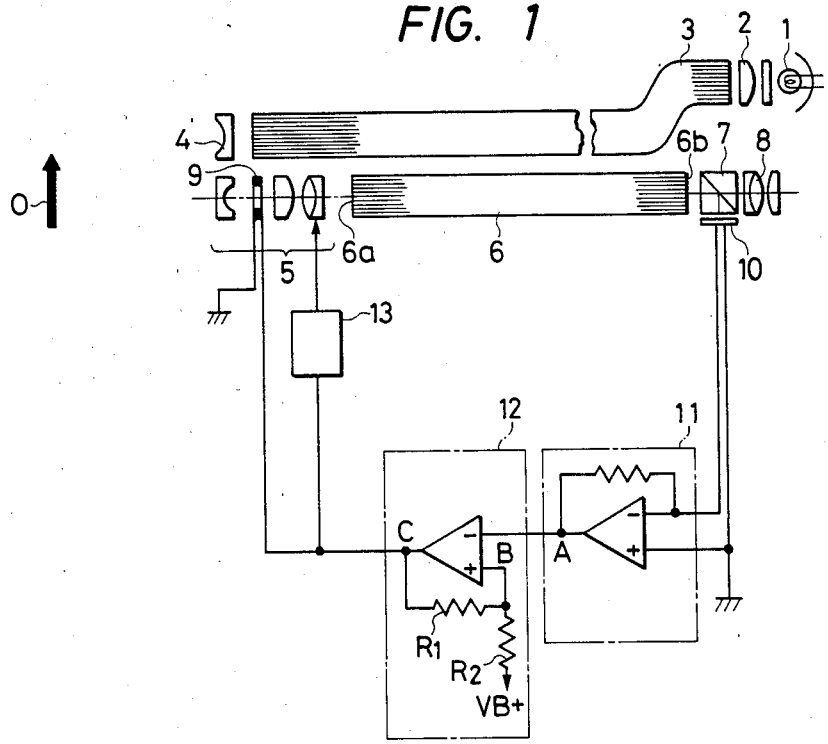
FIG. 1 is a schematic view showing an embodiment of an optical system for endoscopes according to the present invention and a stop controlling circuit thereof.
Figure 2:
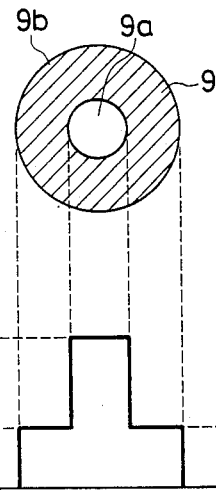
FIG. 2 is a view showing a stop of the embodiment in FIG. 1 and characteristics thereof.

The present invention will hereunder be explained in detail with respect to an embodiment shown in the drawings. FIG. 1 is a schematic view showing an optical system for endoscopes and a stop controlling circuit. Reference numeral 1 denotes a light source, 2 a condenser lens, 3 a light guide and 4 an illuminating lens, which are arranged so that illuminating light emitted from the light source 1 is irradiated on the surface of an object O through the condenser lens 2, the light guide 3 and the illuminating lens 4. Further, reference numeral 5 represents an objective lens unit, 6 an image guide, 7 a beam splitter and 8 an eyepiece. These optical components are arranged so that the image of the object O is formed onto an entrance end face 6a of the image guide 6 through the objective lens unit 5, is relayed to an exit end face 6b of the image guide 6, and is observed through the eyepiece 8 after transmitting the beam splitter 7. Numeral 9 denotes a stop arranged in the objective lens unit 5, for example, at a focus position on the front side of the objective lens unit 5. As shown in FIG. 2, the stop 9 comprises an annular electrochromic element having an opening 9a at the center portion and an annular portion 9b which is formed so as to be in a transparent state (high transmittance level) or in a colored state (low transmittance level), depending on the direction of an applied voltage. Numeral 10 denotes a photoelectric converting element to which a part of light of the object image relayed to the exit end face of the image guide is conducted after reflected by the beam splitter. Numeral 11 represents an amplifier whose input terminal is connected to the photoelectric converting element 10, and numeral 12 represents a comparator comprising a Schmitt circuit whose input terminal is connected to the output terminal of the amplifier 11 and whose output terminal is connected to the stop 9. They are arranged so that voltage generated at the photoelectric converting element 10 in accordance with the amount of incident light is amplified by the amplifier 11 and then is input to the comparator 12.

Figure 3A:
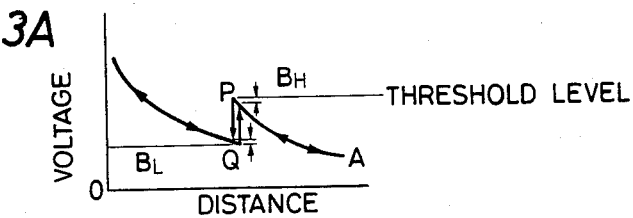
FIGS. 3A, 3B and 3C are diagrams showing variations of voltage in respective portions of the embodiment in FIG. 1.
Figure 3B:
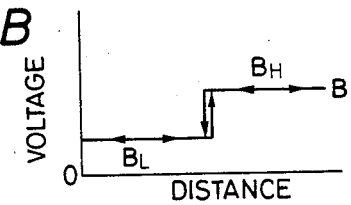
Figure 3C:
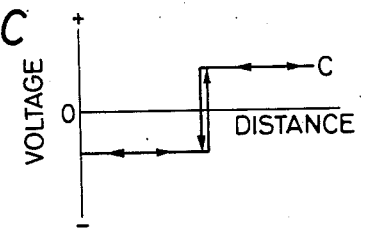

Those components mentioned above constitute the stop controlling circuit, which has the following working principle. When the object O approaches toward the objective lens unit 5 from a far distance in an open state of the stop 9, that is, in a transparent state of the annular portion 9b, the amount of incident light of the objective lens unit 5 increases as the distance reduces, so that the voltage at point A of the amplifier 11 is gradually increased (see FIG. 3A). Further, when the increase of the voltage at the point A exceeds a threshold level of reference voltage $B_H$, the comparator 12 turns the voltage at a point C into negative (see FIG. 3C) and applies reverse voltage to the stop 9. Therefore, the annular portion 9b which has been already, for example, transparent is turned in a colored state, that is, the stop 9 is stopped down, with the result that the amount of incident light on the entrance end face 6a of the image guide 6 decreases. Consequently, the voltage at the point A will drop as shown in FIG. 3A. In the Schmitt circuit, when the voltage at the point C is reversed, the voltage at a point B is varied accordingly (see FIG. 3B). However, if the values of resistances $R_1$, $R_2$ are previously selected in such a way that voltage $B_L$ which has been already varied is somewhat lower than the voltage at the point A in the case of stopping down the stop 9 (see FIG. 3A), the stop 9 is maintained in the same state even if the distance between the object and the objective lens unit 5 (that is, the distal end portion of the endoscope) is more or less varied at the position and even when the objective lens unit 5 is closer to the object.

Conversely, when the object is a short distance with respect to the objective lens unit in a state that the stop 9 is stopped down, and the distance then increases the voltage at the point A is gradually decreased. Further, when this voltage is reduced to be lower than the voltage $B_L$, the comparator 12 turns the voltage at the point C into positive (see FIG. 3C). Consequently, the annular portion 9b of the stop 9 is changed from a colored state to a transparent state, that is, the stop 9 is opened. Although the voltage at the point A is then raised as a result of the fact that the amount of incident light from the objective lens unit 5 is increased, the voltage at the point A remains lower than the voltage $B_H$ since the voltage $B_L$ is set as mentioned above (see FIG. 3A) and the state of the stop 9 is likewise stable.

Reference numeral 13 denotes a driving circuit for the objective lens unit 5 which is connected to the output terminal of the comparator 12 and which moves the objective lens unit 5 to focus a near point when the output of the comparator 12 is negative and to focus a far point when it is positive.

Figure 4:
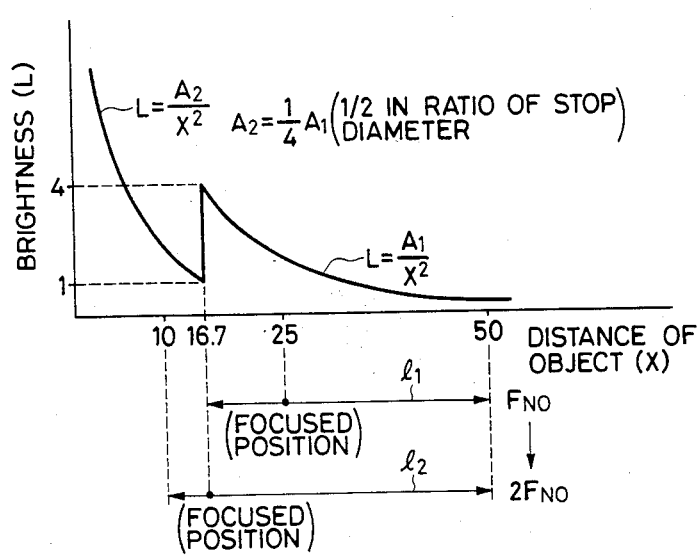
FIG. 4 is a graph showing a working principle of the embodiment in FIG. 1.

The optical system for endoscopes according to the present invention is constituted as described above. That is, when the object O is provided at a far distance, since the amount of incident light from the objective lens unit 5 is reduced, the output of the comparator 12 is turned into positive upon the foregoing principle and the stop 9 is in an open state. Although the depth of field is small when the stop 9 is in an open state, the objective lens unit 5 is then moved to focus a far point by the objective driving circuit 13 and thereby, as shown in FIG. 4, the depth of field can be set to an appropriate depth $l_1$ which focuses a predetermined position at the far point.

On the other hand, when the object O is located at a short distance, since the amount of incident light is increased, the output of the comparator 12 becomes negative and the stop 9 is in a stopped-down state. Although the depth of field is large on the far point side when the stop 9 is in a stopped-down state, the objective lens unit 5 is then moved so as to focus a near point by the objective driving circuit 13 and therefore, as shown in FIG. 4, the depth of field can be set to an appropriate depth $l_2$ which focuses a predetermined position at the near point.

As described above, an aperture stop is controlled in accordance with brightness (that is, the distance to the object) and a focus position is simultaneously change, thereby combining properly variations of the depth of field caused by stop diameters and by the distances to the object with each other, as well as the control of brightness, to allow good observation over a wide range of the distance from the far point to the near point.

Also, in endoscopes, when the position of the objective lens unit 5 is shifted by, for example, a manually operated wire, a precise control of the lens position becomes difficult due to the slack of the wire and the like caused by the deflection of the endoscope body. For this reason, it is preferable in practical use to introduce the conception of a so-called zone focus to adopt a system of shifting stepwise the position of the objective lens unit 5 in accordance with the variations of the stop 9 as mentioned above.

Also, when the stop is provided at the front focus position of the objective lens unit, the depth of focus is given by the formula:

$$1/x_0 - 1/x_{far} = 1/x_{near} - 1/x_0 = F_{NO}/f^2 \phi$$

where $x_0$ is the position of an object focused, $x_{near}$ is the depth of field at a near point, $x_{far}$ is the depth of field at a far point, $F_{NO}$ is F-number, f is the focal length of an objective lens, and $\phi$ is the diameter of the circle of confusion.

As stated above, the optical system for endoscopes according to the present invention allows the stop 9 to be incorporated in the endoscope by constructing it of an electrochromic element and causes the stop 9 to be opened or closed automatically in dependence of the distance between the object O and the objective lens unit 5, with the result that the variation of brightness in the field of view corresponding to variation in the distance to the object is moderated and an endoscope which is very convenient for use can be constituted. Further, a proper depth of field can always be maintained independently of the distance to the object O.

Figure 5:
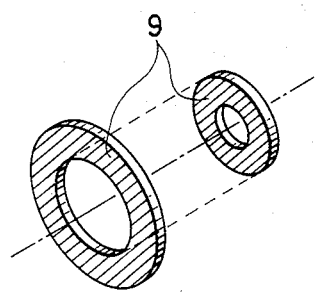
FIG. 5 is a perspective view showing another example of a stop formation.

Although the above-mentioned embodiment shows the stop 9 to be a single-stage stop, the use of a stop comprising two or more electrochromic elements arranged along an optical axis, as shown in FIG. 5, allows a stop with two stages or more. Further, the embodiment is formed so that the transmittance of the stop 9 is varied stepwise. However, the applied voltage of the stop 9 alternates positive and negative states and its ratio is changed to thereby enable the transmittance to be continuously varied. Moreover, it is possible to maintain constantly the transmittance by holding evenly the ratio.

Figure 6:
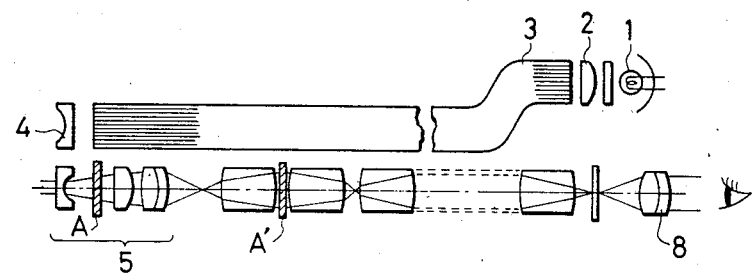
FIG. 6 is a schematic view showing another embodiment of an optical system for endoscopes according to the present invention.

Also, for the stop 9, it is favorable to be placed at the front focus position of the objective lens unit in the case of fiber scopes or electronic scopes, whereas in nonflexible endoscopes, the stop 9 may be arranged, in addition to the front focus position of the objective lens unit, at the pupil position of the image transmitting system, as shown by symbols A and A' in FIG. 6, and the exit pupil position of the eyepiece. Further, if the light amount adjustment of the light source 1 and the automatic sensitivity adjustment on the side of a TV camera to be provided in the rear of the eyepiece 8 are combined with the stop control and the focus adjustment, better photographs and TV picture images with proper brightness can be secured. In addition, the photoelectric converting element 10 for measuring the brightness of an object to be photographed may be arranged at the front end face of the endoscope body, the periphery in front of the stop 9 and the end face, on the side of the light source 1, of a fiber bundle made up with the light guide 3, besides the arrangement shown in the foregoing embodiment. Also, in the case of using a pickup tube as in a TV or an image pickup device instead of the image transmitting optical system, arrangement may be made so that a signal for brightness is directly taken out thereof.

What is claimed is:

1. An endoscope that uses an illuminating device to emit light from a distal portion of said endoscope onto an area of a object to be observed and an objective lens unit to focus an image of said area on a predetermined image forming surface comprising:

an electro-optical stop means disposed in said objective lens unit for changing an amount of light that strikes said predetermined image forming surface to obtain a proper depth of field and brightness, said stop means including:

a light transmitting section of a predetermined size disposed along an optical axis of said objective lens unit, and a variable light transmitting section that surrounds said light transmitting section and is capable of changing alternatively to one of a light transmitting state and a light interrupting state;

a photoelectric converting means that receives at least a portion of said light incident on said objective lens unit for generating a signal representative of said portion of said incident light; and control means respective to said signal for controlling said stop means with an output signal so that said variable light transmitting section is in said light interrupting state when a distance between said object and said distal portion is short and a value of said signal is larger than a predetermined value and said variable light transmitting section is in said light transmitting state when said distance is far and said value of said signal is lesser than said predetermined value.

2. An endoscope according to claim 1 wherein said stop means is made from an electrochromic material.

3. An endoscope according to claim 1 or 2 wherein said light transmitting section of said stop means has a circular from and said variable section has an annular form.

4. An endoscope according to claim 1 or 2 wherein said objective lens unit includes a plurality of relay lenses for image transmission are arranged in a rear section of said objective lens unit and said stop means is provided in said plurality of relay lenses.

5. An endoscope according to claim 1 or 2 wherein said variable light transmitting section includes a first variable section having an annular form and a second variable section having an annular form concentric with said first variable section and having a size that surrounds an outer diameter of said first variable section.

6. An endoscope according to claim 1 or 2, wherein said endoscope further includes a driving means connected to said control means for moving said objective lens unit in focus, said objective lens unit being moved in focus in accordance with a variation of said output signal from said control means.

7. An endoscope according to claim 1 or 2, wherein said photoelectric converting means is an image pickup device.

* * * * *